United States Patent [19]
Del Bucchia et al.

[11] Patent Number: 5,976,219
[45] Date of Patent: Nov. 2, 1999

[54] METHOD AND APPARATUS FOR RECYCLING OF SCRAP METAL

[75] Inventors: Henry Del Bucchia, Fruitvale; Phil Babakaiff, Castlegar, both of Canada

[73] Assignee: Cominco Ltd., Vancouver, Canada

[21] Appl. No.: 08/642,108

[22] Filed: May 2, 1996

[51] Int. Cl.⁶ .................................................. C21B 15/00
[52] U.S. Cl. ........................... 75/743; 266/170; 266/171
[58] Field of Search .................................... 266/168, 170, 266/171; 75/743, 744

[56] References Cited

U.S. PATENT DOCUMENTS

| | | | |
|---|---|---|---|
| 3,967,958 | 7/1976 | Coffield et al. | 75/743 |
| 4,606,763 | 8/1986 | Weir | 75/743 |
| 5,082,251 | 1/1992 | Whipp | 266/171 |
| 5,346,532 | 9/1994 | Sinclair et al. | 75/744 |
| 5,554,206 | 9/1996 | Czermak et al. | 266/171 |

FOREIGN PATENT DOCUMENTS 1171548  8/1985  U.S.S.R. .

OTHER PUBLICATIONS

P. 358 of text–book entitled "Introduction to Inorganic Chemistry" by G.I. Brown, BA, BSc, Assistant Master, Eton College; published by Longman Group Ltd., London, Dec. 1974.

*Primary Examiner*—Scott Kastler
*Attorney, Agent, or Firm*—Elbie R. de Kock

[57] ABSTRACT

A process for the recycling of scrap metal, such as copper wire, comprises the steps of combining the scrap metal with a concentrate of a metal similar to the scrap metal in a pressure vessel (10) and subjecting the metal concentrate to pressure oxidation along with the scrap metal. In one example the scrap metal comprises copper wire and the metal concentrate comprises a copper matte. An apparatus (16) for feeding the scrap metal to the autoclave (10), without interrupting the operation of the autoclave (10) is also provided.

11 Claims, 2 Drawing Sheets

METHOD AND APPARATUS FOR RECYCLING OF SCRAP METAL

FIELD OF THE INVENTION

This invention relates to a method and apparatus for the recycling of scrap metal, such as the recycling of copper scrap material.

BACKGROUND OF THE INVENTION

In certain operations where useful byproducts are formed, these byproducts are subjected to pressure leaching in order to produce saleable products. For example, in a lead smelting operation for the recovery of lead, copper matte is obtained as a byproduct. In order to increase the commercial viability of the process, the copper matte is further treated in a pressure leaching stage in an autoclave to convert the copper matte to copper sulphate, which, for example, is useful as an animal feed supplement.

Sometimes the throughput of such byproduct treatment operations is limited by limited amounts of the byproduct, which reduces the economic viability of the operation.

It is an object of the present invention to provide a process for enhancing the output of such a byproduct treatment operation by the recycling of scrap material.

It is also an object of the present invention to provide a process and apparatus for the recycling of a scrap material for the production of a useful product.

SUMMARY OF THE INVENTION

According to the invention there is provided a process for the recycling of scrap metal comprising the steps of combining the scrap metal with a concentrate of a metal similar to the scrap metal in a pressure vessel and subjecting said metal concentrate to pressure oxidation along with the scrap metal.

The scrap metal and the metal concentrate may be fed to the autoclave in separate streams.

The scrap metal may be in any form suitable for introduction into the autoclave, such as a powder, a metal salt, crystals, balls, wire, metal skimmings and metallic drosses.

Also according to the invention there is provided in a process for the production of copper sulphate from copper matte by pressure oxidation of the copper matte in the presence of sulphuric acid in an autoclave, the step of introducing copper scrap material into the autoclave and subjecting the copper scrap material to pressure oxidation with the copper matte.

Further according to the invention there is provided an apparatus for introducing a solid material into a pressure vessel, comprising: a pressure chamber; a feed inlet for solid material into said pressure chamber; a discharge outlet from said pressure chamber which is in communication with the interior of the pressure vessel; a first valve operative between said pressure chamber and said inlet for opening and closing said inlet; a second valve operative between said pressure chamber and said outlet for opening and closing said outlet; and means for pressurizing the pressure chamber when said inlet and said outlet are closed.

Further objects and advantages of the invention will become apparent from the description of a preferred embodiment of the invention below.

DETAILED DESCRIPTION OF PREFERRED EMBODIMENT

Figure 1:
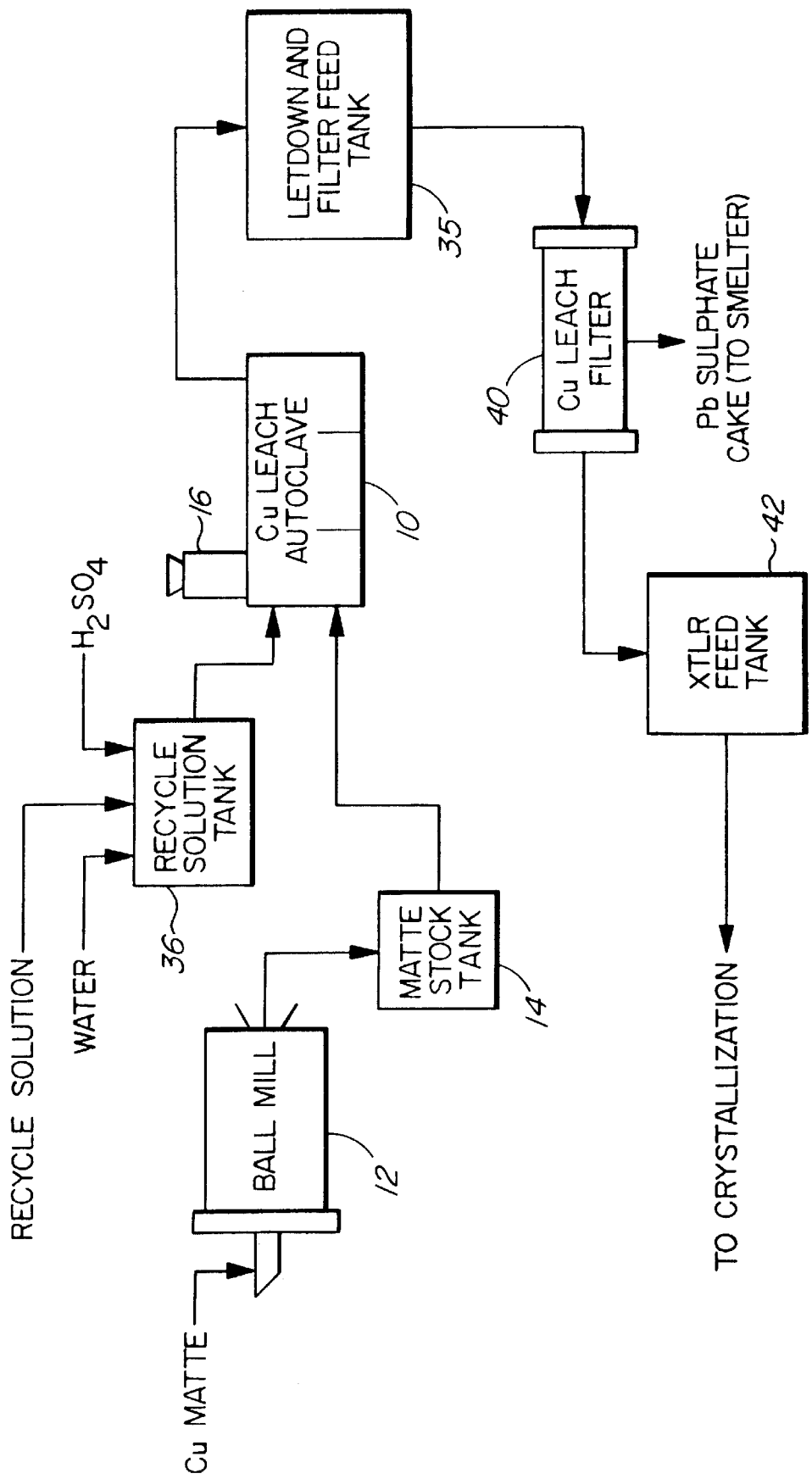
FIG. 1 is a flow diagram illustrating the method according to the invention.

Referring to FIG. 1, copper matte from a lead smelter is treated in a continuous pressure leaching process in a pressure vessel or autoclave 10 to convert the copper sulphide in the matte to soluble copper sulphate.

The pressure leaching stage is in effect a pressure oxidation and it is carried out in the presence of oxygen using sulphuric acid.

The matte contains several minerals, such as copper sulphide ($Cu_2S$), copper arsenide ($Cu_3As$), lead sulphide (PbS) and elemental lead as bullion.

The following reactions take place in the autoclave 10:

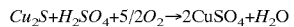

$$Cu_2S + H_2SO_4 + 5/2 O_2 \rightarrow 2CuSO_4 + H_2O$$

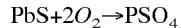

$$PbS + 2O_2 \rightarrow PSO_4$$

The matte is screened as it is fed to a ball mill 12 for grinding, first at one inch and then 6 mesh. The oversize materials are crushed and then returned for rescreening. Eventually the lead bullion particles greater than 6 mesh are returned to the lead smelter for processing.

The ball mill 12 grinds the matte to 80%-200 mesh.

The matte, is stored in a stock tank 14 in the form of a slurry at 75% solids, from where it is fed to the autoclave 10.

In addition to the copper matte slurry, scrap copper wire is introduced into the autoclave 10 to be leached with the copper matte. An aspect which renders the process feasible is the introduction of the scrap material to the autoclave separately from the metal concentrate.

Figure 2:
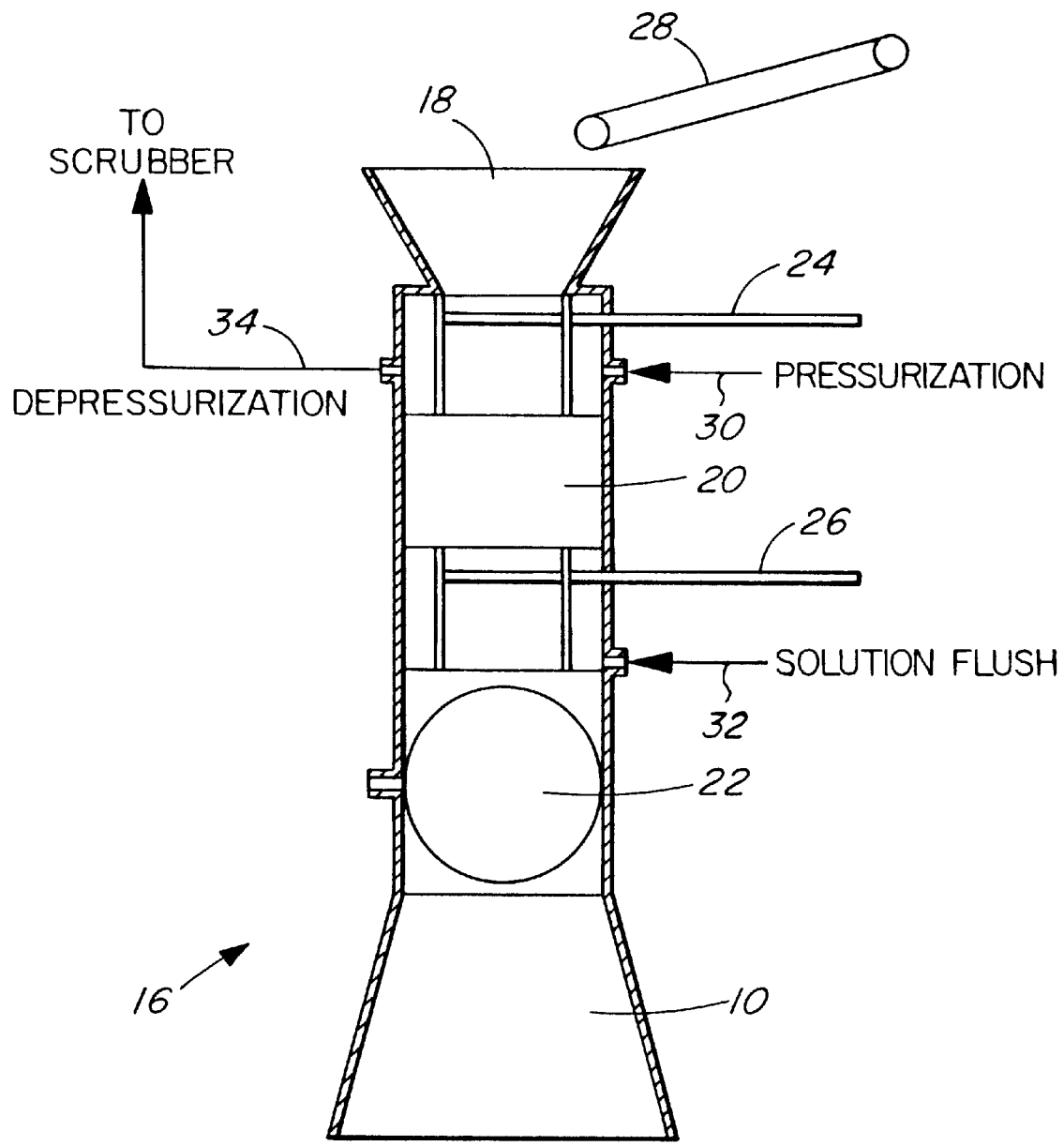
FIG. 2 is a schematical side view of an apparatus for use in the method according to the invention.

The copper wire is fed to the autoclave 10 using a feeding apparatus 16, which is shown in more detail in FIG. 2. The feeding apparatus 16 overcomes the pressure difference between the autoclave pressure and atmospheric pressure, so that the copper wire can be fed to the autoclave 10 without interrupting the leaching operation.

The feeding apparatus 16 comprises a hopper 18 leading into a pressurization chamber 20 which in turn leads into the autoclave 10 via a safety valve, in the form of a ball valve 22.

A first rotating disc valve 24 is operative between the hopper 18 and the chamber 20 and a second rotating disc valve 26 is operative between the chamber 20 and the autoclave 10. The valves 24 and 26 have self cleaning faces.

A feeder in the form of a conveyor belt 28 is provided for feeding scrap copper wire to the hopper 18.

In operation, copper wire is introduced into the chamber 20 by opening the valve 24 while the valve 26 is closed. Once the chamber 20 is charged with copper wire, the valve 24 is closed and the chamber 20 is pressurized by the introduction of gas under pressure, as indicated by the arrow 30, in order to increase pressure in the chamber 20 to above that of the autoclave 10.

The autoclave 10 is then charged with copper wire by opening the valve 26 while the valve 24 remains closed. The cycle is then repeated for a next batch of copper wire.

In this way the autoclave 10 is charged without interrupting the pressure leach in the autoclave 10.

A solution flush, as indicated by the arrow 32, is used at one or more locations to sweep the system clean when required.

Prior to opening the valve 24 for the next charge, the chamber 20 is depressurized, as indicated by the arrow 34 and the gas content of the chamber 20 is passed to a scrubber.

During the pressure leach in the autoclave 10, the matte and the copper wire react with the acid at 160° C. under 1380 kPa gauge pressure of oxygen. The copper is leached into solution and the lead remains in the residue as lead sulphate. Additional acid is introduced into the autoclave 10 to ensure the complete dissolution of the copper wire according to the equation:

$$Cu^\circ + 2H^+ + \tfrac{1}{2}O_2 \rightarrow Cu^{+2} + H_2O$$

The slurry discharged from the autoclave 10 is fed to a letdown and filter feed tank 35.

Sulphuric acid for effecting the leaching operation is fed to the autoclave 10 from a recycle tank 36, which also contains water and mother liquor which is recycled from a crystallizer in which the copper sulphate is crystallized. The sulphuric acid, water and mother liquor are mixed in the recycle tank 36 in suitable proportions for optimum leaching of copper in the autoclave 10.

When feeding the autoclave 10, the matte and mother liquor are sampled regularly to determine the Pb, Cu, $H_2SO_4$ and As content. These assays are used to calculate the acid flow to and the total flow from the recycle tank 36. Normal target levels for solution discharging from the autoclave 10 are 180 g/l Cu and 15 g/l $H_2SO_4$.

The autoclave discharge slurry is kept hot to prevent crystallization of the copper sulphate in the filter feed tank 35. The slurry is then filtered through a filter press 40 to separate the copper sulphate solution from the lead sulphate cake. The cake is washed and discharged from the filter 40 into a lugger box for return to the smelter to recover the lead and silver values. The filtrate is passed to a feed tank 42.

From the feed tank 42, the copper sulphate solution is fed continuously to a crystallizer section for the production of copper sulphate.

Specific tests will now be described by way of the examples below.

Example 1

A three compartment metallurgical autoclave operating at 160° C. and 1380 kPa gauge oxygen pressure, was used. The autoclave was charged with spent crystallizer sulphate solution, a 75% copper matte slurry and make up water. The system was operated in a continuous mode and the autoclave residence time was 90 minutes.

The autoclave produced a discharge containing 180 g/l copper sulphate in solution.

With the system operating as above, the autoclave was also charged with 20 kg/h of copper scrap material, in the form of chopped copper wire, using the apparatus 16 of FIG. 2. The stoichiometric amount of 96% sulphuric acid was also added to the autoclave to allow for the increase in copper input.

The autoclave discharge copper tenor increased to 186 g/l. The result was achieved after 6 hours of operation.

No evidence of undissolved metallic copper wire was detected in the leach residue.

Example 2

A leach similar to the one described in Example 1 was carried out but charging the autoclave with 40 kg/h of chopper copper wire, targeting a leachate of 175 g/l copper and 15 g/l excess sulphuric acid. After 6 hours of operation, the leachate assayed 174 g/l copper and 16 g/l free acid, indicating successful leaching at the 40 kg/h chopped wire addition rate.

The addition of chopped copper wire was then stopped, but the other leaching parameters were not altered, i.e. the copper matte feed rate and acid feed rate were kept constant. After 7 hours of operation, the leachate assayed 147 g/l copper and 60 g/l free acid, confirming that the additional of copper scrap material is a useful supplement to the leaching process.

Example 3

A three compartment metallurgical autoclave, operating at 110° C. and 1380 kPa oxygen gauge pressure, was used to leach only scrap copper wire, (i.e., without the addition of any copper matte slurry,) at a rate of 160 kg/h. The leach solution used was water and sulphuric acid, with targets of 170 g/l Cu and 45 g/l free acid. The residence time was 210 minutes for the rates used.

After 10 hours, the leachate assayed 165 g/l Cu and 45 g/l free acid. The amount of residue was very small and consisted of residual material from previous normal operation. There was no evidence of unreacted copper wire in the residue.

This test demonstrates that copper input to the process can be in the range from 0 to 100% of the feed input.

While only preferred embodiments of the invention have been described herein in detail, the invention is not limited thereby and modifications can be made within the scope of the attached claims.

What is claimed is:

1. A process for the recycling of scrap metal comprising the steps of combining scrap metal wire with a concentrate of a metal which is the same metal as the scrap metal, in a pressure vessel and subjecting said metal concentrate to pressure oxidation along with the scrap metal.

2. The process according to claim 1, wherein the scrap metal and said metal concentrate are fed to the pressure vessel in separate streams.

3. The process according to claim 2, wherein the scrap metal comprises copper and the metal concentrate comprises a copper sulphide source material.

4. The process according to claim 3, wherein the copper sulphide source material comprises a copper matte.

5. The process according to claim 4, wherein the pressure oxidation is effected in the presence of sulphuric acid to produce a copper sulphate solution.

6. An apparatus for introducing a solid material into a pressure vessel, comprising:

a pressure chamber;

a feed inlet for solid material into said pressure chamber;

a discharge outlet from said pressure chamber which is in communication with the interior of the pressure vessel;

a first rotating disc valve operative between said pressure chamber and said outlet for opening and closing said inlet;

a second rotating disc valve operative between said pressure chamber and said outlet for opening and closing said outlet;

means for pressurizing the pressure chamber when said inlet and said outlet are closed; and means for flushing the pressure chamber to counteract build-up of solid material in said chamber.

7. The process according to claim 1, wherein the pressure oxidation is carried out in a continuous fashion and further comprising the step of intermittently feeding the scrap metal to the pressure vessel under pressure.

8. A process for the production of copper sulphate from a copper sulphide source material, comprising the steps of:

s18subjecting the copper sulphide source material to pressure oxidation with sulphuric acid in the presence of oxygen in a pressure vessel to convert the copper sulphide source material to copper and sulphate ions in solution; and introducing scrap copper wire into the pressure vessel to convert the copper wire to copper ions in solution to supplement the copper ions produced by the pressure oxidation of the copper sulphide source material.

9. The process according to claim 8, wherein the pressure oxidation of the copper sulphide source material is carried out in a continuous fashion and further comprising the step of intermittently feeding the copper scrap material to the pressure vessel under pressure.

10. The process according to claim 8, wherein the copper sulphide source material comprises copper matte.

11. The process according to claim 8, wherein the copper sulphide source material comprises a copper concentrate.

* * * * *

UNITED STATES PATENT AND TRADEMARK OFFICE
CERTIFICATE OF CORRECTION

PATENT NO. : 5,976,219 Page 1 of 1
DATED : November 2, 1999
INVENTOR(S) : Del Bucchia, Henry et al.

It is certified that error appears in the above-identified patent and that said Letters Patent is hereby corrected as shown below:

Column 4,
Line 58, replace "outlet" with -- inlet --

Signed and Sealed this

Eighth Day of April, 2003

JAMES E. ROGAN
*Director of the United States Patent and Trademark Office*